United States Patent [19]
Kohmoto et al.

[11] Patent Number: 5,434,714
[45] Date of Patent: * Jul. 18, 1995

[54] ZOOM LENS BARREL

[75] Inventors: Shinsuke Kohmoto; Tomoaki Kobayashi, both of Tokyo, Japan

[73] Assignee: Asahi Kogaku Kogyo Kabushiki Kaisha, Tokyo, Japan

[*] Notice: The portion of the term of this patent subsequent to Oct. 27, 2009 has been disclaimed.

[21] Appl. No.: 284,047

[22] Filed: Aug. 1, 1994

Related U.S. Application Data

[60] Continuation of Ser. No. 991,195, Dec. 16, 1992, abandoned, which is a division of Ser. No. 500,011, Mar. 27, 1990, abandoned.

[30] Foreign Application Priority Data

| Mar. 31, 1989 | [JP] | Japan | 1-37878 |
| Mar. 31, 1989 | [JP] | Japan | 1-81255 |
| Mar. 31, 1989 | [JP] | Japan | 1-81256 |

[51] Int. Cl.$^6$ .............................. G02B 9/08
[52] U.S. Cl. ..................... 359/740; 359/233; 354/253; 354/288; 354/234.1
[58] Field of Search ........ 350/227, 233, 236, 738–740; 354/187, 202, 253, 273, 288, 234.1, 195.1–195.12

[56] References Cited

U.S. PATENT DOCUMENTS

| 3,918,076 | 11/1975 | Shono | 354/219 |
| 3,978,503 | 8/1976 | Shono | 354/250 |
| 4,051,502 | 9/1977 | Mielke | 359/700 |
| 4,086,604 | 4/1978 | Douglas | 354/219 |
| 4,132,463 | 1/1979 | Sakaguchi et al. | 359/676 |
| 4,161,756 | 7/1979 | Thomas | 358/225 |
| 4,171,897 | 10/1979 | Fujita et al. | 354/234 |
| 4,324,457 | 4/1982 | Tomori | 359/695 |
| 4,333,712 | 6/1982 | Tomori | 359/695 |
| 4,387,968 | 6/1983 | Sekiguchi | 359/694 |
| 4,445,756 | 5/1984 | Komoto | 359/694 |
| 4,445,762 | 5/1984 | Boccuti | 354/437 |
| 4,448,496 | 5/1984 | Isobe et al. | 359/695 |
| 4,523,815 | 6/1985 | Tomori | 359/695 |

(List continued on next page.)

FOREIGN PATENT DOCUMENTS

| 0053922 | 6/1982 | European Pat. Off. . |
| 2373804 | 7/1978 | France . |
| 2645282 | 10/1990 | France . |
| 1914930 | 9/1963 | Germany . |
| 3018481 | 11/1980 | Germany . |
| 3026215 | 1/1981 | Germany . |
| 3531983 | 3/1986 | Germany . |
| 3638255 | 5/1987 | Germany . |
| 3809611 | 10/1988 | Germany . |
| 57-167016 | 10/1983 | Japan . |
| 60-6914 | 1/1985 | Japan . |
| 62-237416 | 10/1987 | Japan . |
| 62-244026 | 10/1987 | Japan . |

(List continued on next page.)

OTHER PUBLICATIONS

The *Yearbook for Optics and Fine Mechanics,* 1972, pp. 33–37.

*Primary Examiner*—Georgia Y. Epps
*Assistant Examiner*—Thomas Robbins
*Attorney, Agent, or Firm*—Sandler, Greenblum & Bernstein

[57] ABSTRACT

A barrier mechanism for a zoom lens assembly which includes a stationary lens barrel and a rotatable cam ring which is supported on the stationary lens barrel for movement in the direction of the optical axis while being rotated, and which includes at least two cam grooves. The barrier mechanism of the lens barrel includes a pair of barrier plate assemblies which are adapted to open and close an opening of the lens barrel, wherein each of the pair of barrier plate assemblies includes a pair of plate elements which are symmetrically arranged with respect to a center of the opening. In the closed position, the barrier plates are arranged side by side.

27 Claims, 9 Drawing Sheets

U.S. PATENT DOCUMENTS

| | | | |
|---|---|---|---|
| 4,576,446 | 3/1986 | Kamata | 359/694 |
| 4,621,906 | 11/1986 | Hashimoto et al. | 359/694 |
| 4,627,691 | 12/1986 | Tomori | 359/694 |
| 4,696,559 | 9/1987 | Kondo | 359/676 |
| 4,697,891 | 10/1987 | Kawai | 359/694 |
| 4,752,796 | 6/1988 | Tsukahara et al. | 354/187 |
| 4,779,964 | 10/1988 | Ozawa | 359/683 |
| 4,786,153 | 11/1988 | Ogata | 359/754 |
| 4,797,700 | 1/1989 | Tsuji et al. | 354/271.1 |
| 4,822,153 | 4/1989 | Tomori et al. | 359/694 |
| 4,842,385 | 6/1989 | Tanaka | 359/683 |
| 4,848,884 | 7/1989 | Enomoto | 359/694 |
| 4,876,563 | 10/1989 | Ishida et al. | 354/234.1 |
| 4,884,091 | 11/1989 | Nakagomi | 354/271.1 |
| 4,890,133 | 12/1989 | Ogawa et al. | 354/402 |
| 4,910,544 | 3/1990 | Nomura | 354/195.12 |
| 4,944,030 | 7/1990 | Haraguchi et al. | 354/403 |
| 4,950,054 | 8/1990 | Wada et al. | 359/694 |
| 4,974,949 | 12/1990 | Tanaka | 359/694 |
| 4,976,523 | 12/1990 | Ishikawa | 359/694 |
| 4,978,204 | 12/1990 | Ito | 359/676 |
| 4,989,027 | 1/1991 | Iishi et al. | 354/253 |
| 5,033,819 | 7/1991 | Tanaka | 359/827 |
| 5,040,017 | 8/1991 | Arai | 354/439 |
| 5,043,752 | 8/1991 | Kohmoto | 354/195.12 |
| 5,065,172 | 11/1990 | Ogawa et al. | 354/195.1 |
| 5,066,968 | 11/1991 | Suzuki et al. | 354/400 |
| 5,130,730 | 7/1992 | Ishii et al. | 354/253 |
| 5,136,315 | 8/1992 | Nomura | 354/187 |
| 5,144,493 | 9/1992 | Nomura | 359/700 |
| 5,159,372 | 10/1992 | Nomura et al. | 354/253 |
| 5,170,294 | 12/1992 | Haraguchi et al. | 359/900 |
| 5,233,472 | 8/1993 | Haraguchi et al. | 359/694 |
| 5,245,476 | 9/1993 | Shono | 359/699 |
| 5,313,329 | 5/1994 | Ueda | 359/676 |

FOREIGN PATENT DOCUMENTS

| | | | |
|---|---|---|---|
| 63-239430 | 10/1988 | Japan . | |
| 1-171430 | 12/1989 | Japan . | |
| 107937 | 5/1991 | Japan | 359/819 |
| 2238393 | 5/1991 | Japan | 359/819 |
| 1391292 | 4/1975 | United Kingdom . | |
| 1466369 | 3/1977 | United Kingdom . | |
| 1523135 | 8/1978 | United Kingdom . | |
| 2039067 | 7/1980 | United Kingdom . | |
| 2054878 | 2/1981 | United Kingdom . | |
| 2112957 | 7/1983 | United Kingdom . | |
| 2164470 | 3/1986 | United Kingdom . | |
| 2223862 | 4/1990 | United Kingdom . | |
| 2230354 | 10/1990 | United Kingdom . | |
| 2229010 | 12/1990 | United Kingdom . | |
| 8707038 | 11/1987 | WIPO . | |

ZOOM LENS BARREL

This application is a continuation, of application Ser. No. 07/991,195, filed Dec. 16, 1992, now abandoned, which is a Divisional application of application Ser. No. 07/500,011 filed on Mar. 27, 1990, now abandoned.

BACKGROUND OF THE INVENTION

1. Field of the Invention

The present invention relates to a zoom lens barrel which can be advantageously used with a compact camera having a photographing optical system and a separate finder optical system.

2. Description of Related Art

In a recent zoom compact camera, a zoom lens can be retracted beyond a photographing position in which a picture can be taken to reduce the storage length of the zoom lens. In this compact camera, in case where separate tracks can be provided for respective lens groups of the zoom lens, return tracks thereof can be optionally set. However, in case of a zoom lens camera having more than two lens groups of which two or more lens groups move together, there is a limit to the accommodation length of the zoom lens.

A zoom lens having more than two groups of lenses is known as so-called vari-focal lens. The vari-focal lens has an advantage that it is easy to achieve a high variable power. However, a vari-focal lens is usually not used in a single-lens reflex camera, since a shift of focus (a change of focus point) occurs during zooming. On the contrary, in an auto-focus compact camera which has a separate photographing optical system and a finder optical system, the shift of focus which takes place during zooming can be compensated for by the displacement of the focusing lens group. Namely, since the focus position of the focusing lens group on which a focused image of an object to be taken can be formed on a film plane can be calculated in advance in accordance with the focal length and the object distance, it is possible to move the focusing lens group to the the calculated position to compensate for the shift of focus. Accordingly, in a compact camera, the vari-focal lens can be used as a zoom lens. Note that although a lens in which no shift of focus takes place during zooming is usually called a zoom lens, and a lens in which the shift of focus takes place during zooming is usually called a vari-focal lens, both lenses will be referred to as a "zoom lens" in the present specification.

In a vari-focal lens having three lens groups, the focusing is effected by a second lens group which is located between a first lens group and a third lens group. Generally speaking, in a zoom lens, upon assembly, the focusing lens group is moved in the optical axis direction to effect a zooming adjustment. The zooming adjustment is an adjustment in which no shift of focus occurs when the zooming is effected at a reference object distance (usually, the infinite distance). However, in a vari-focal lens having three lens groups, it is very difficult to perform the zooming adjustment by the second lens group which is located between the first and third lens groups.

SUMMARY OF THE INVENTION

The primary object of the present invention is to provide a zoom lens barrel which has more than two lens groups, of which two lens groups move together within a zooming range, and to decrease the accommodation length of the zoom lens.

Another object of the present invention is to provide a barrier mechanism which controls a barrier to open and close a photographing aperture, with the help of means for decreasing the accommodation length of the zoom lens.

Still another object of the present invention is to provide a zoom lens barrel in which the zooming adjustment can be easily effected, in a vari-focal zoom lens having three lens groups, of which a second lens group between a first lens group and a third lens group performs the focusing.

To achieve the object mentioned above, according to the present invention, there is provided a zoom lens barrel having at least three lens groups and a cam ring which has a zooming section and a lens accommodation section and which rotates to control the position of the lens groups. At least two lens groups of the at least three lens groups are capable of moving together in the zooming section means are also provided for releasing the integral movement of the at least two lens groups which are capable of moving together in the zooming section and in the lens accommodation section, so that the front lens group can be independently moved to come close to the rear lens group.

According to another aspect of the present invention, there is provided a barrier mechanism which opens and closes the photographing opening of a zoom lens barrel and which is actuated by the movement of the front lens group and the rear lens group to come close to each other.

The inventors of the present invention have also found that the zooming adjustment can be effected by the first lens group other than the focusing lens group, i.e. the second lens group. Accordingly, in still another aspect of the present invention, the first lens group is provided with a zooming adjustment mechanism, i.e. an adjustment mechanism of the axial position thereof.

BRIEF DESCRIPTION OF THE DRAWINGS

The invention will be described below in detail with reference to the accompanying drawings, in which.

DESCRIPTION OF PREFERRED EMBODIMENTS

The following embodiments are directed to a vari-focal zoom lens having three lens groups.

Figure 6:
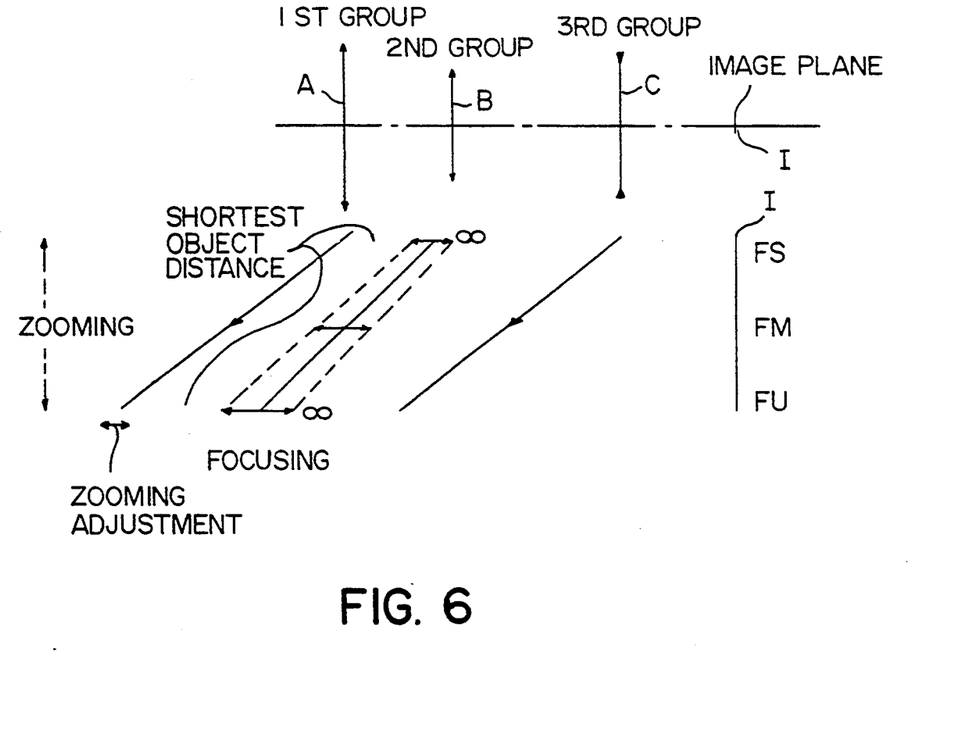
FIG. 6 is a schematic view of an optical track showing a principle of a vari-focal zoom lens and a zooming adjustment according to the present invention.

First, with reference to FIG. 6, the optical construction of such a vari-focal zoom lens and zooming and focusing functions thereof will be described below.

The vari-focal zoom lens has three lens groups, first lens group A, second lens group B and third lens group C. In the illustrated embodiment, the first and second lens groups consist of positive lenses and the third lens group consists of a-negative lens.

When the first and second lens-groups A and B move away from an image plane I and when the spatial distance therebetween is varied, the focal length is changed from a shortest focus fS to an intermediate focus fM, and further to a longest focus fL. When the second lens group B is moved at the respective focuses, the focusing is effected. The third lens group C mainly varies the power (magnification) and can be formed integral with the first lens group A.

Upon zooming, the shift of focus in the vari-focal zoom lens mentioned above occurs, so that the focusing lens group (second lens group B) is moved and controlled to compensate for the change of the focus. Namely, the focusing lens group B is moved so as to compensate for the shift of focus at each object distance and at each focal length.

Figure 1A:
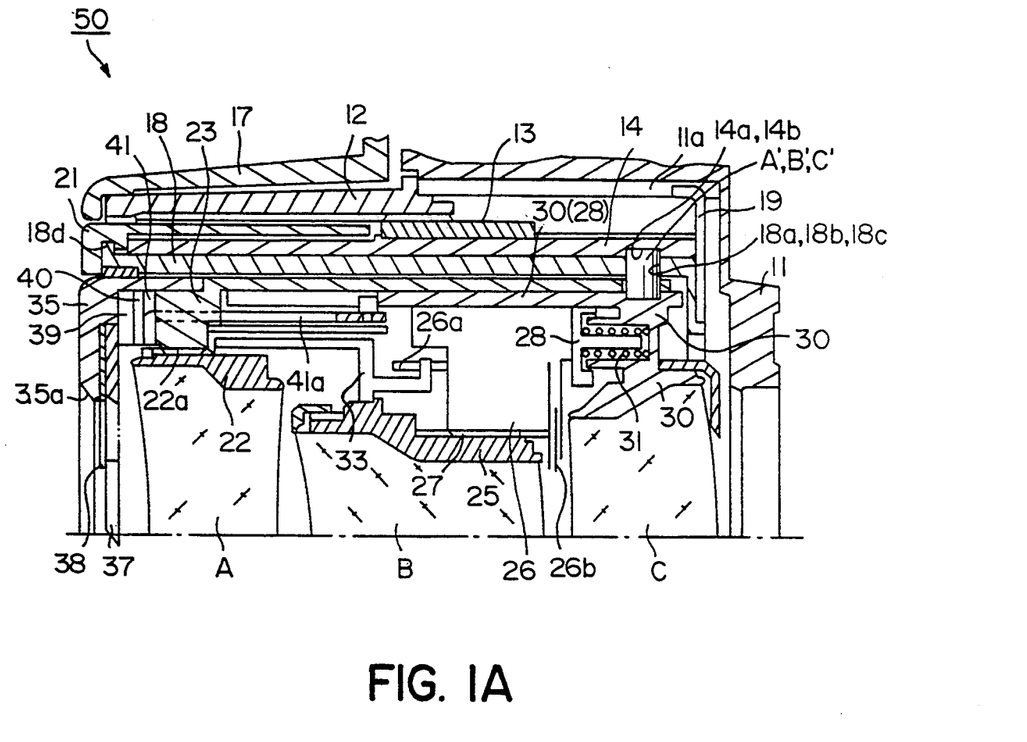
FIGS. 1A, 1B and 1C are longitudinal sectional views of an upper half of a zoom lens according to the present invention, shown in an accommodated position, a shortest focal length position and a longest focal length position, respectively.
Figure 1B:
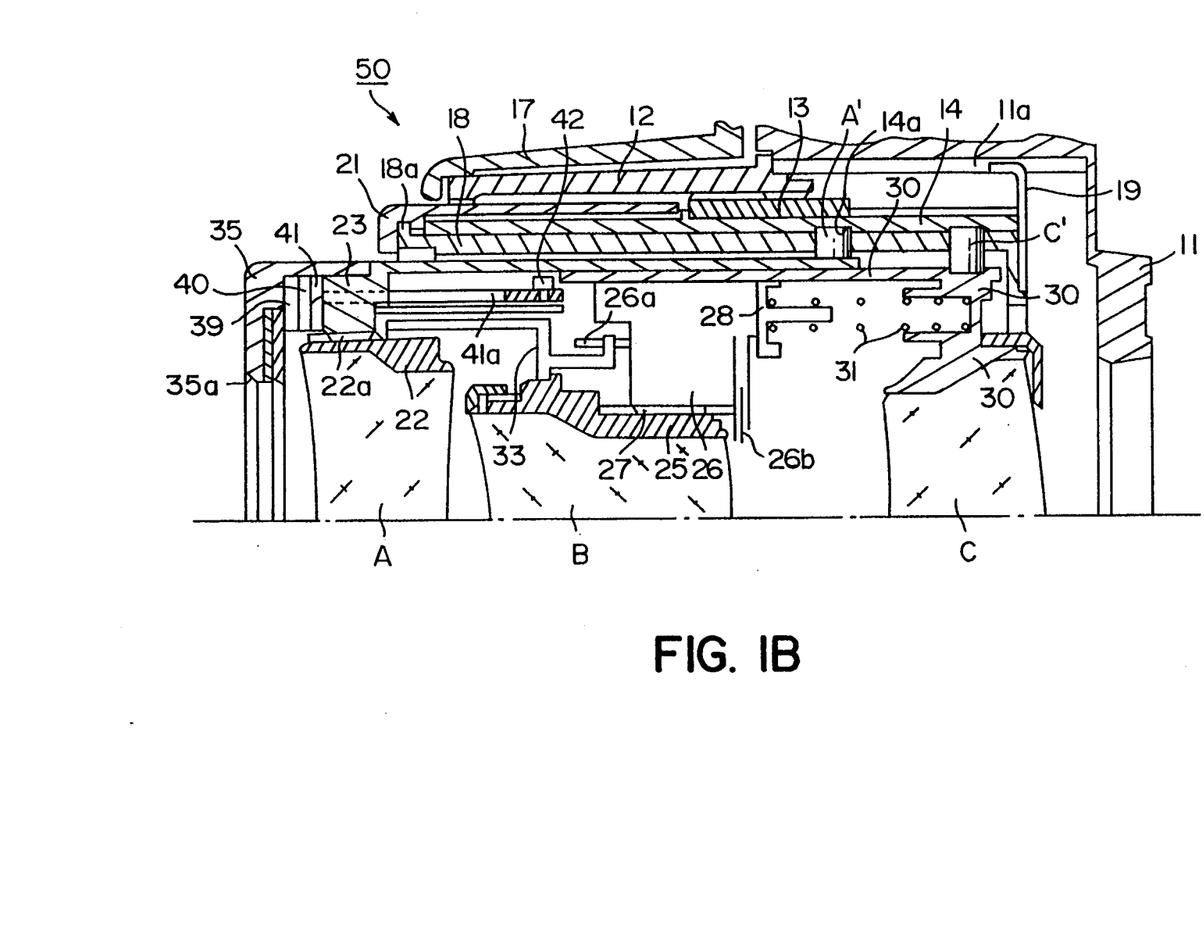
Figure 1C:
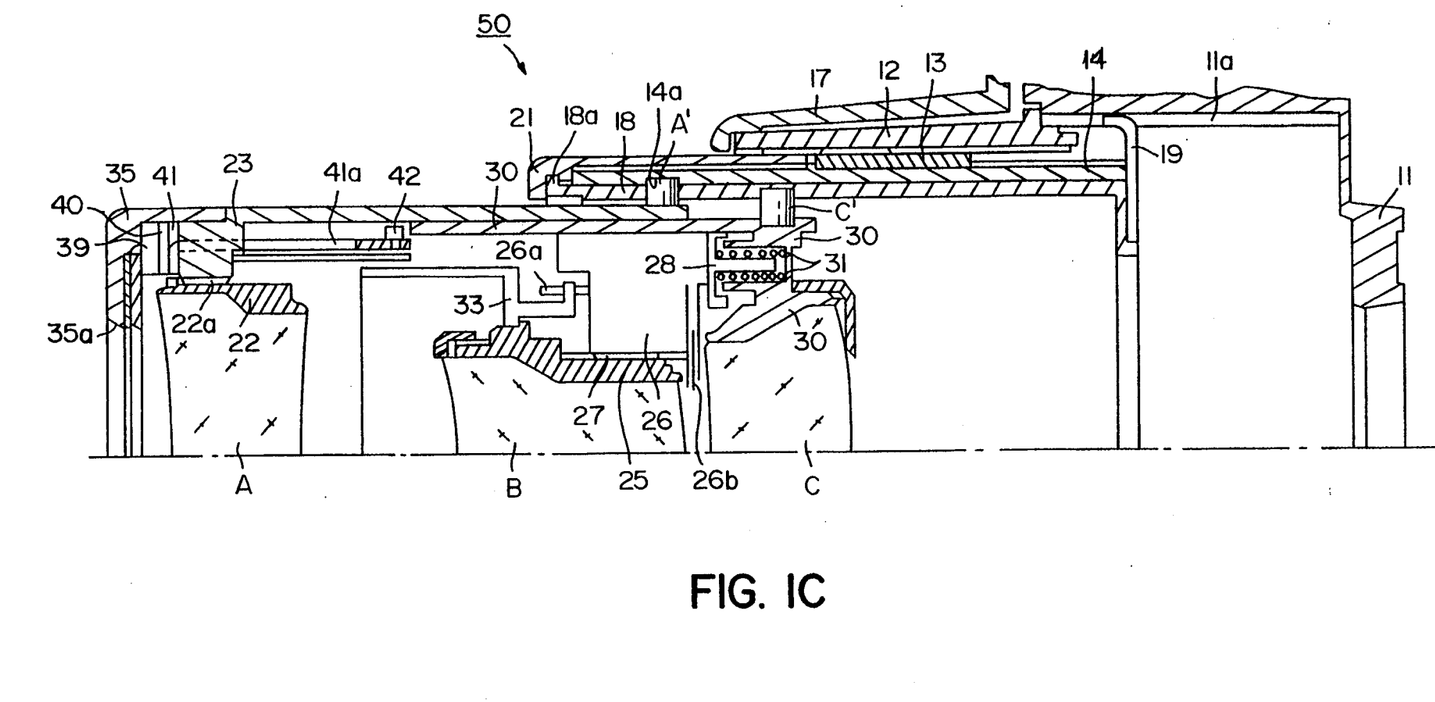
Figure 2:
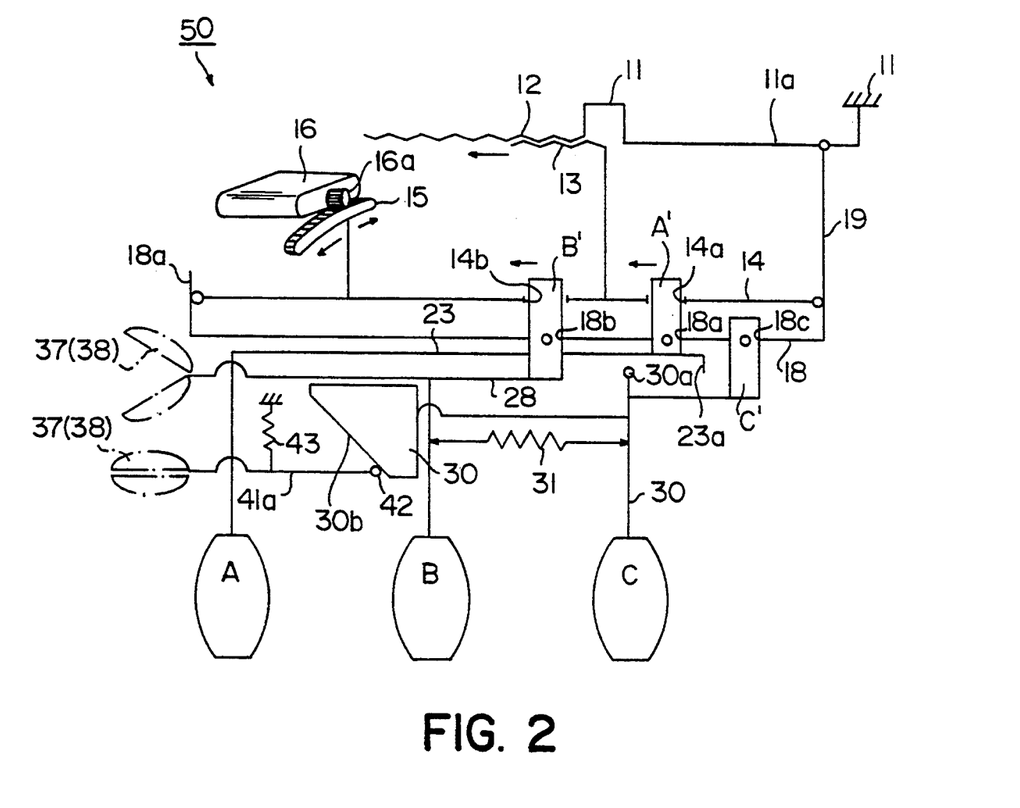
FIG. 2 is a skeleton diagram of a zoom lens shown in FIGS. 1A–1C.

FIGS. 1A through 1C show a zoom lens having a vari-focal lens according to the present invention. FIG. 1A shows an accommodation (retracted) position, FIG. 1B a shortest focus (WIDE) position, and FIG. 1C a longest focus (TELE) position. FIG. 2 is a skeleton view showing a basic construction of a zoom lens barrel.

The following is the movement of the lens groups A, B and C in accordance with the present invention.

The first lens group A and the third lens group C move together in a photographing range in which a picture can be taken, between the WIDE extremity shown in FIG. 1B and the TELE extremity shown in FIG. 1C. The second lens group B moves relative to the first and third lens groups A and C to vary the spatial distance between the second lens group and the first lens group and between the second lens group and the third lens group to effect the zooming. The focusing is effected by the second lens group B. Upon a further rearward movement (retraction) of the first, second and third lens groups beyond the WIDE extremity shown in FIG. 1B toward the accommodation position shown in FIG. 1A, the first lens group A is made independent (released) from the third lens group C, so that the first lens group A and the second lens group B can be moved to come close to the third lens group C in order to minimize the accommodation length.

A stationary ring 11 secured to a camera body has an outer helicoid 12 (inner peripheral surface helicoid) secured thereto. The outer helicoid 12 is engaged by an inner helicoid (outer peripheral surface helicoid) 13 which is secured to a cam ring 14. The cam ring 14 has a gear 15 secured thereto, which is engaged by a pinion 16a of a zoom motor 16, as schematically shown in FIG. 2. Consequently, when the zoom motor 16 is driven, the cam ring 14 is axially moved in the optical axis direction, in accordance with the lead of the inner helicoid 13. Preferably, the teeth of the gear 15 are inclined in the same direction as those of the inner helicoid 13. A front cover 17 covers the outer portion of the outer helicoid 12.

A linear movement ring 18 is fitted in the inner periphery of the cam ring 14. The linear movement ring 18 has a linear movement guide plate 19 secured to the rear end thereof. The linear movement guide plate 19 is partially engaged at the outer periphery thereof in a linear movement guide groove 11a formed in the stationary ring 11. An outer flange 18d is formed on the front end of the linear movement ring 18, so that the cam ring 14 is rotatably held between the outer flange 18d and the linear movement guide plate 19 so as not to move in the optical axis direction. Namely, the rotation of the linear movement ring 18 which can move together with the cam ring 14 in the optical axis direction is prevented by the linear movement guide plate 19. The cam ring 14 can rotate relative to the linear movement ring 18. A lens cover 21 is secured to the outer flange 18d.

A first lens frame 22 which supports the first lens group A is secured to a first lens moving ring 23 by an adjusting screw 22a. The adjusting screw 22a is adapted to effect the zooming adjustment upon assembly, in which no shift of focus occurs during zooming at a predetermined reference object distance. According to the present invention, the zooming adjustment can be performed by the first lens group A other than the focusing lens group, i.e. the second lens group B as shown by a solid line in FIG. 6. Since the first lens group A is located frontmost, the zooming adjustment by the first lens group A is simpler and preciser than the zooming adjustment by the second lens group B.

Figure 3:
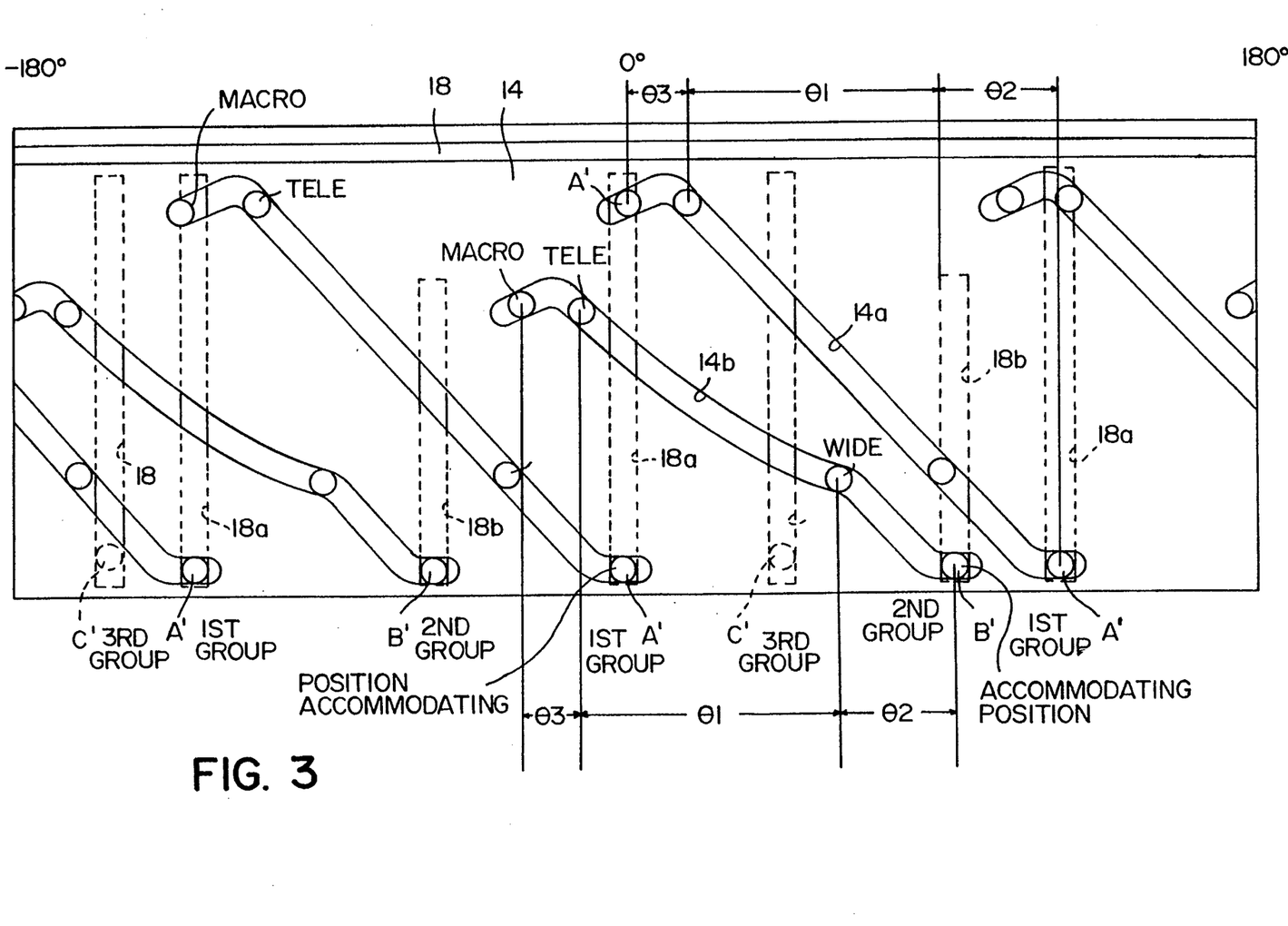
FIG. 3 is a developed view showing a relationship between cam grooves of a cam ring, linear movement guide grooves of a linear movement ring, and rollers of first, second and third lens groups.

The first lens moving ring 23 is provided on its rear portion with first group rollers A' which extend through corresponding linear movement guide grooves 18a (FIG. 3) formed in the linear movement ring 18 and is fitted in first group cam grooves 14a of the cam ring 14.

A second lens frame 25 which supports the second lens group B is screw-engaged by an inner peripheral helicoid 27 of a shutter unit 26. The shutter unit 26 is secured to a second lens moving ring 28 which is provided on its rear portion with second group rollers B'. The second group rollers B' extend through corresponding linear movement guide grooves 18b (FIG. 3) formed in the linear movement ring 18 and is fitted in second group cam grooves 14b of the cam ring 14.

Third group rollers C' are directly provided on a third lens frame 30 which supports the third lens group C. The third group rollers C' are fitted in corresponding linear movement guide grooves 18c of the linear movement ring 18. Unlike the first group rollers A' and the second group rollers B', the third group rollers C' are not fitted in the cam grooves.

Each of the first group cam grooves 14a and the second group cam grooves 14b has a zooming section $\theta1$, an accommodation section $\theta2$ before the zooming section $\theta1$, and a macro transferring section $\theta3$ after the zooming section $\theta1$. The accommodation sections $\theta2$ are for additional retraction (rearward movement) of the first, second and third lens groups A, B and C beyond the WIDE extremity. The macro transferring sections $\theta3$ are for a slight forward movement of the first, second and third lens groups A, B and C from the TELE extremity to bring the lens groups in a macro photographing position. The reasons that the inclination of the first group cam grooves 14a and the second group cam grooves 14b is small, and that the inclination of the first group cam grooves 14a is opposite to that of the second group cam grooves 14b in the macro transferring section θ3 are that the cam ring 14 itself is moved forward by the outer helicoid 12 (and the inner helicoid 13). Namely, the displacement of the first lens group A (and the third lens group C) and the displacement of the second lens group B are determined by a resultant inclination of the lead of the outer helicoid 12 and the inclination of the first and second group cam grooves 14a and 14b.

Figure 4:
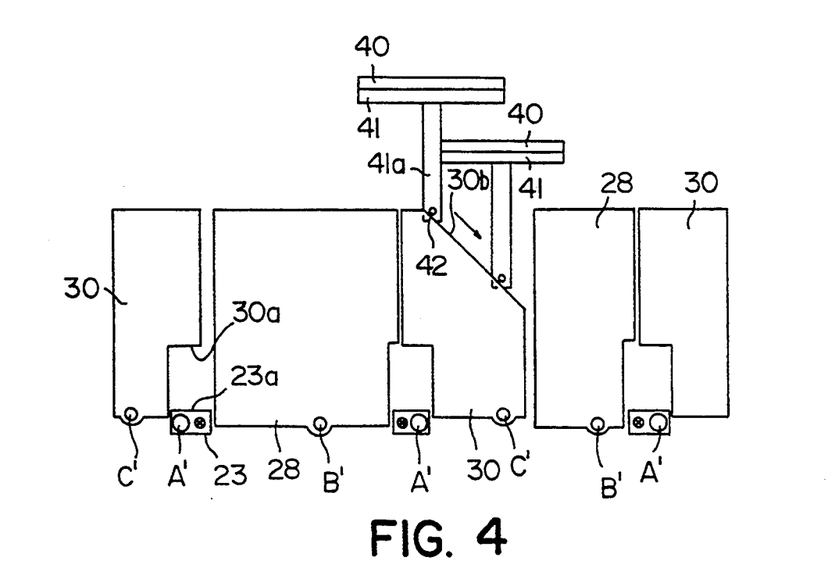
FIG. 4 is a developed view showing a positional relationship between a third lens frame and a second lens moving ring.

Between the third lens frame 30 and the first lens moving ring 23 are provided engaging portions 30a and 23a (FIGS. 2 and 4) which engage with each other while the first lens moving cam groove 23 moves from the accommodation position shown in FIG. 1A to the WIDE extremity shown in FIG. 1B in accordance with the accommodation section θ2 of the first group cam grooves 14a. Namely, when the cam ring 14 rotates, the first lens moving ring 23 moves in the optical axis direction in accordance with the engagement of the first group rollers A' and the first cam grooves 14a. However, the engaging portions 30a and 23a are always brought into contact with each other when the first group rollers A' are in the zooming sections θ1 and the macro transferring section θ3 of the first group cam grooves 14a. Accordingly, the first lens moving ring 23 (first lens group A) and the third lens frame 30 (third lens group C) move together. On the other hand, when the first group rollers A' enter the accommodation sections θ2 of the first group cam grooves 14a, the third group rollers C' come into abutment with the rear ends of the linear movement guide grooves 18c, so that the third lens frame 30 stops. In this state, the engaging portion 23a is disengaged from the engaging portion 30a to move independently. The second lens group B' is moved rearwardly in accordance with the engagement of the second group rollers B' and the second cam grooves 14b, so that the first, second and third lens groups A, B and C are moved rearwardly as a whole to shorten the accommodation length.

Between the second lens moving ring 28 and the third lens frame 30 are provided compression springs 31 which are located at a predetermined angular distance in the circumferential direction to continuously bias the third lens frame 30 rearwardly to bring the engaging portion 30a into engagement with the engaging portion 23a of the first lens moving ring 23.

As is well known, the shutter unit 26 rotates a drive pin 26a by an angle corresponding to an object distance detected by an object distance measuring device. The drive pin 26a is associated with a connection ring secured to the second lens frame 25, so that when the drive pin 26a rotates, the second lens group B moves in the optical axis direction with rotation in accordance with the inner peripheral helicoid 27. The connection ring 33 is secured to the second lens frame 25 after the adjustment (focus adjustment) of the second lens frame 25 in the optical axis direction is finished. The shutter unit 26 opens and closes shutter blades 26b in accordance with the luminance of an object to be taken detected by a light measuring device.

To the front end of the first lens moving ring 23 is secured a decorative frame 35 having a photographing opening (aperture) 35a which is substantially rectangular in shape. A barrier mechanism 36 which opens and closes the photographing aperture 35a of the decorative frame 35 is located between the decorative frame 35 and the first lens moving ring 23. The barrier mechanism 36 is shown in detail in FIGS. 7, 8A and 8B.

Figure 7:
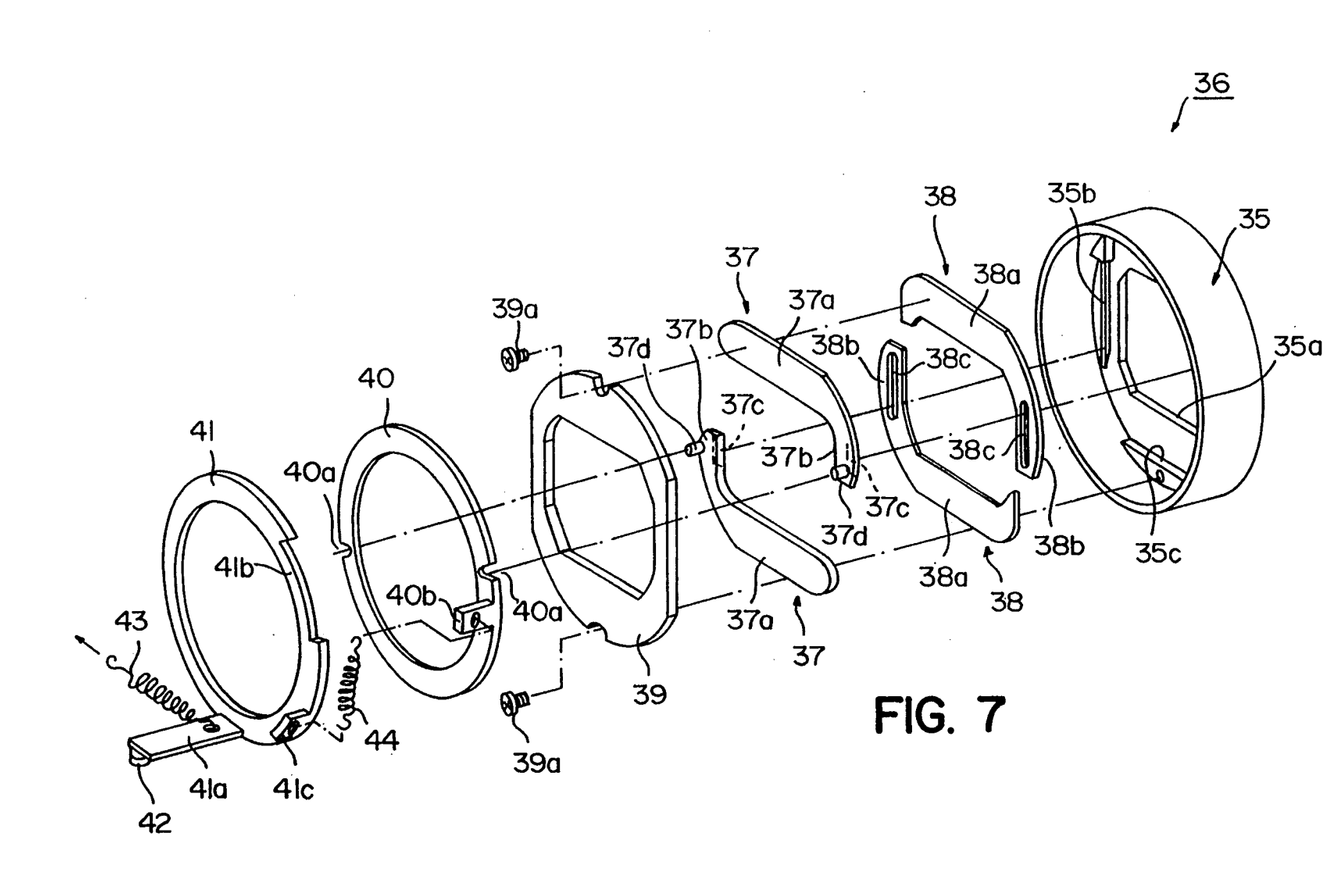
FIG. 7 is an exploded perspective view of a barrier mechanism provided on a zoom lens barrel shown in FIGS. 1A–1C; and, FIGS. 8A and 8B are back views of a barrier shown in an open position and a closed position, respectively.

On the back side of the decorative frame 35 are formed a pair of slide movement restriction grooves 35b which extend in parallel with the short side of the photographing opening 35a. The decorative frame 35 has at its back side, stepped portions (projections) 35c which restrict the movement of first and second barrier plates 37 and 38 which are received in the decorative frame 35, together with the slide movement restricting grooves 35b.

Each of the first and second barrier plates 37 and 38 have a pair of plate elements, each having an opening and closing portion 37a or 38a which extends substantially in parallel with the long side of the substantially rectangular photographing opening 35a and drive guide portion 37b on 38b which is connected to the opening and closing portion 37a or 38a and which extend substantially in parallel with the short side of the photographing opening 35a. The drive guide portions 37b or 38b of each pair of barrier plates 37 or 38 extend in the opposite directions.

Figure 8A:
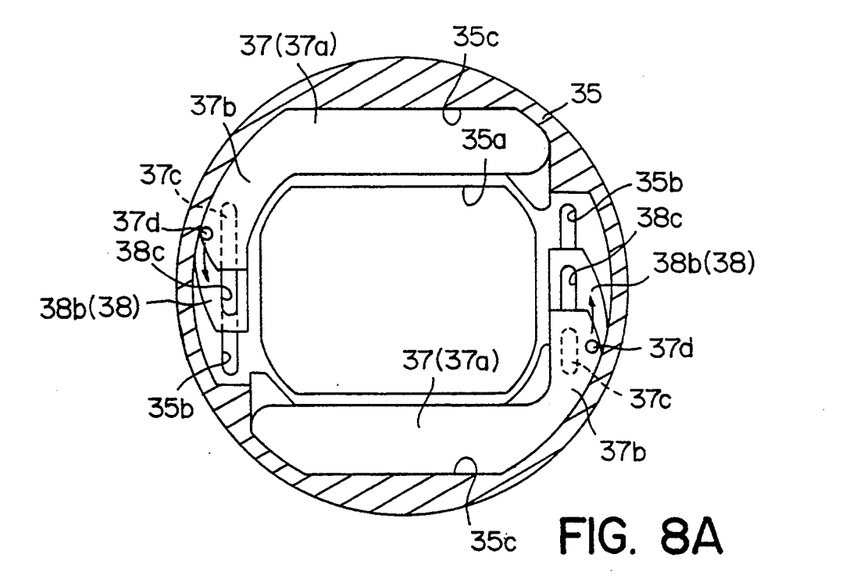

The first and second barrier plates 37 and 38 can be put one on another, so that they can be accommodated in the decorative frame 35 outside the photographing opening 35 of the decorative frame 35, as shown in FIG. 8A.

The opening and closing portions 37a of the first barrier plates 37 are provided, on their front and rear side faces, with key projections 37c and association pins 37d, respectively. The opening and closing portions 38a of the second barrier plates 38 are provided with elongated holes 38c in which the key projections 37c are fitted. The associated elongated holes 38c usually come into, contact with one end of the corresponding key projections 37c and come into contact with the other ends of the corresponding key projections 37c when the first and second barrier plates 37 and 38 are aligned in which the ends thereof are partially overlapped.

The key projections 37c are fitted in the corresponding slide movement restricting grooves 35b through the elongated holes 38c. With this fitting engagement, the directions of the slide movements of the first and second barrier plates 37 and 38 are restricted. The first and second barrier plates 37 and 38 are held by and between the decorative frame 35 and a supporting plate 39 which is secured to the stepped portions 35c of the decorative frame. 35 by set screws 39a.

An annular drive plate 40 and an annular rotational plate 41 are inserted in the decorative frame 35. The drive plate 40 has radial association grooves 40a which are diametrically opposed. The association pins 37d of the first barrier plates 37 are fitted in the corresponding association grooves 40a. In the alternative, first barrier plates 37 may contain association grooves, with the drive plate 40 having association pins fitted in the corresponding association grooves. The rotational plate 41 has a drive arm 41a integral therewith which extends in the optical axis direction. The drive arm 41a has at its rear end a roller 42 which bears against a tapered surface 30b (FIGS. 4 and 5) formed at the front end of the third lens frame 30.

The drive plate 40 has an association projection 40b which is fitted in a circumferential recess 41b of the rotational plate 41. The rotational plate 41 has a projection 41c to which one end of a tensile spring 44 is connected. The opposite end of the spring 44 is connected to the association projection 40b of the drive plate 40.

The rotational plate 41 is biased by a tensile spring 43 which is provided between the drive arm 41a and a stationary portion of the lens barrel, in a direction that the barrier plates 37 and 38 close the photographing opening 35a. The rotational plate 41 and the drive plate 40 are usually rotated together by the tensile spring 44, and when the force is applied to the drive plate 40 (i.e. when a force to prevent the barrier plates 37 and 38 from rotating is applied), the tensile spring 44 is extended to permit the rotational plate 41 and the drive plate 40 to rotate relative to each other.

The tapered surface 30b of the third lens frame 30 comes into contact with the roller 42 of the rotational plate 41 when the third lens frame 30 moves together with the first lens moving ring 23 in the optical axis direction in the accommodation section $\theta2$. The tapered surface 30b pushes the roller 42 to rotate the rotational plate 41 by the necessary angular displacement for the operation (open and close) of the barrier.

Figure 5:
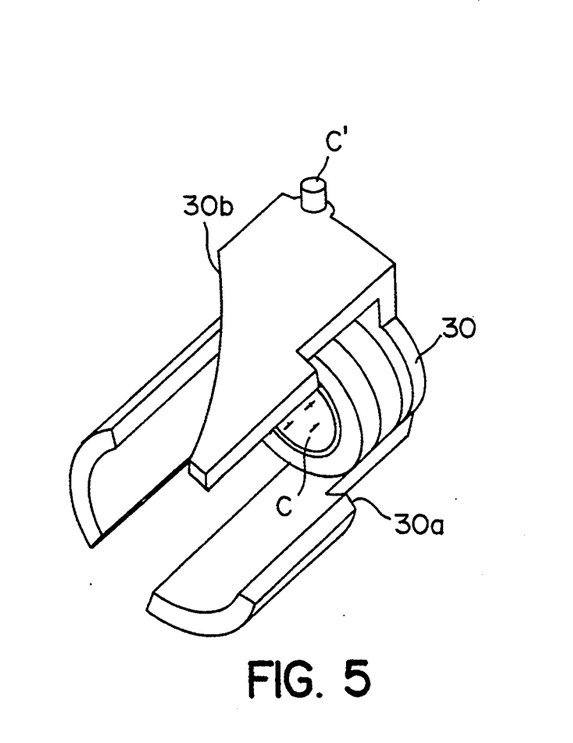
FIG. 5 is a perspective view of a third lens frame.

The force of the tensile spring 43 becomes largest and smallest when the first and second barrier plates 37 and 38 open and close the photographing aperture 35a, respectively. Namely, the spring force of the tensile spring 43 becomes gradually large when the barrier plates 37 and 38 are gradually opened. To this end, the rotational force to be applied to the rotational plate 41 is preferably gradually changed from a small value to a large value. Such a gradual change of the spring force can be achieved by the tapered surface 30b having a cam profile which causes the rotational plate 41 to rotate in such a way that an angular displacement of the rotational plate 41 for unit displacement of the third lens frame 30 decreases as the spring force increases, as shown in FIG. 5.

In the zoom lens barrel mentioned above, when the zoom motor 16 is rotated in the forward and reverse directions to rotate the cam ring 14 in the clockwise and counterclockwise directions, the cam ring 14 is moved in the optical axis direction while rotating by the engagement of the inner helicoid 13 and the stationary outer helicoid 12, so that the axial movement of the linear movement ring 18 in the same direction takes place. As a result, since the rotation of the linear movement ring 18 is restricted by the linear movement guide plate 19 and the linear movement guide groove 11a, a relative rotation takes place between the cam ring 14 and the linear movement ring 18. Consequently, the first lens group A and the second lens group B are moved in the optical axis direction in accordance with the first group cam grooves 14a and the second group cam grooves 14b.

The third lens group C stops before the first group cam grooves 14a of the cam ring 14 cause the first lens moving ring 23 to move in the accommodation section $\theta2$ in order to engage the engaging portion 23a of the first lens moving ring 23 with the engaging portion 30a of the third lens frame 30, since the third group rollers C' are located at the rear ends of the linear movement guide grooves 18c. When the engaging portions 23a and 30a engage with each other, a further rotation of the cam ring 14 toward the zooming section $\theta1$ causes the third lens group C to move together with the first lens group A. As a result, in the zooming section. $\theta1$, the first, second and third lens groups A, B and C move in the optical axis direction in accordance with a predetermined relationship between the first group cam grooves 14a and the second group cam grooves 14b to effect the zooming.

The above discussion can be applied to the transfer from the zooming section $\theta1$ to the macro transferring section $\theta3$.

On the contrary, in case of transfer from the zooming section $\theta1$ to the accommodation section $\theta2$, when the engaging portions 23a and 30a engage with each other, the first lens group A and the third lens group C move together. However, when the rearward movement of the third lens group C is restricted by the linear movement guide grooves 18c, only the first lens group A is moved rearwardly to come close to the third lens group C. At the same time, the second lens group B is moved rearwardly in accordance with the second group cam grooves 14b to come close to the third lens group C, thereby to shorten the lens accommodation length, as shown in FIG. 1A.

Namely, in the zoom lens barrel as constructed above, first, the lens accommodation length can be shortened by the fact that the cam ring 14 moves in the optical axis directions while rotating, that the linear movement ring 18 moves in the optical axis direction together with the cam ring 14, and that the profiles of the first group cam grooves 14a and the second group cam grooves 14b are designed so as to move the first lens group A (the third lens group C) and the second lens group B in accordance with the relative rotation of the cam ring 14 and the linear movement ring 18. Second, the lens accommodation length can be shortened also by the break of the integral connection of the first lens group A and the third lens group C upon entry into the accommodation portion of the zoom lens barrel, so that both the first lens group A and the second lens group B move to come close to the third lens group C.

The barrier mechanism 36 operates in accordance with the relative movement of the first lens group A and the second lens group B as follows.

Figure 8B:
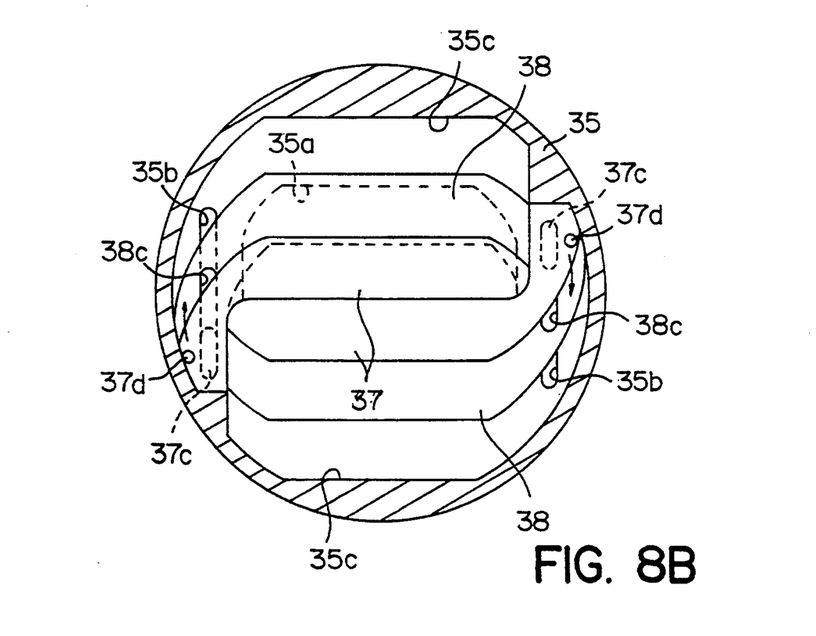

When no external force is applied to the rotational plate 41, the first and second barrier plates 37 and 38 are closed by the spring force of the tensile spring 43, as shown in. FIG. 8B. When the first lens moving ring 23 is advanced in the accommodation section $\theta2$, the engagement position of the tapered surface 30b of the third lens frame 30 which moves relative to the first lens moving ring 23 and the roller 42 of the drive arm 41a changes, so that the rotational plate 41 and the drive plate 40 are rotated against the spring force of the tensile spring 43. As a result, the association pins 37d of the barrier plates 37 are moved in the direction shown by arrows in FIG. 8B through the drive plate 40, so that a pair of barrier plates 37 move to come away from the center of the photographing opening 35a. The key projections 37c of the first barrier plates 37 move in the corresponding elongated holes 38c of the second barrier plates 38, and accordingly, the second barrier plates 38 do not move (It is assumed that no movement due to the frictional force occurs). When the first barrier plates 37 move and are superimposed on the associated second barrier plates 38, so that the key projections 37c of the first barrier plates 37 reach the ends of the association elongated holes 38c of the second barrier plates 38, the second barrier plates 38 begin moving. As a result, the first and second barrier plates 37 and 38 move together toward the retracted position (FIG. 8A) in which the barrier plates 37 and 38 are located outside the photographing opening 35a. Thus, the photographing opening 35 is opened.

At the retracted position in which the first barrier plates 37 and the second barrier plates 38 open the photographing opening 35a, when the third lens frame 30 moves relative to the first lens moving ring 23 from the accommodation section θ2, the cam surface (tapered surface) 30b causes the rotational plate 41 to rotate against the tensile spring 43. Consequently, the association pins 37d of the first barrier plates 37 move in the direction shown at the arrows in FIG. 8A through the drive plate 40, so that the first barrier plates 37 move toward the center of the photographing opening 35a. In the beginning stage of the movement, the key projections 37c move in the corresponding elongated holes 38c of the second barrier plates 38, so that no movement of the second barrier plates 38 takes place (It is assumed that no movement due to the frictional force occurs). When the key projections 37c reach the ends of the elongated holes 38c, the second barrier plates 38 begin moving. When the opening and closing portions 37a of the first barrier plates 37 come into abutment with each other at the center of the photographing opening 35a, the opening and closing portions 38a of the second barrier plates 38 and the opening and closing portions 37a of the first barrier plates 37 are located side by side, as shown in FIG. 8B. Namely,, the spaces surrounding the opening and closing portions 37a of the first barrier plates 37 in the photographing opening 35a are closed by the opening and closing portions 38a of the second barrier plates 38. Thus, the first barrier plates 37 and the second barrier plates 38 close the photographing opening 35a (FIG. 8B).

We claim:

1. A barrier mechanism of a lens barrel having a plurality of barrier plates for opening and closing an opening of said lens barrel, said barrier plates being slidable relative to each other, so as to open and close said opening, between an operative position, in which at least two of said barrier plates are substantially overlapped to open said opening, and an inoperative position, in which said barrier plates are extended to a partially overlapped position in which said barrier plates close said opening, wherein when said barrier plates are in said inoperative position, said at least two barrier plates overlap each other to a lesser extent than when said barrier plates are in said operative position.

2. A barrier mechanism according to claim 1, wherein said barrier plates comprise an automatic closing mechanism for automatically closing upon accommodation of a lens into said lens barrel.

3. A barrier mechanism according to claim 2, further comprising an opening mechanism for opening said barrier plates upon engagement of said opening mechanism by an engagement surface of a movable lens frame, wherein said opening mechanism and said engagement surface are disengaged upon accommodation of said lens.

4. A barrier mechanism according to claim 1, further comprising means for opening said barrier plates upon engagement of said means for opening by an engagement surface of a movable lens frame.

5. A barrier mechanism of a lens barrel according to claim 1, wherein said barrier mechanism comprises means guiding said barrier plates for translational movement.

6. A barrier mechanism in accordance with claim 1, wherein said plurality of barrier plates comprise two sets of barrier plates, wherein said barrier plates in each set of said two sets of barrier plates are overlapped to different extents in said operative and inoperative positions, said two sets being located along opposed sides of said lens barrel opening.

7. A barrier mechanism of a lens barrel, said barrier mechanism comprising a pair of barrier plate assemblies which are positioned adjacent to an opening of said lens barrel to open and close the opening of said lens barrel, wherein each of said pair of barrier plate assemblies comprises a pair of plate elements which are symmetrically arranged with respect to a center of the opening.

8. A barrier mechanism according to claim 7, wherein each of said barrier plate assemblies comprises a pair of barrier plates so that said barrier mechanism comprises a pair of first barrier plates and a pair of second barrier plates.

9. A barrier mechanism according to claim 8, wherein said first and second barrier plates are biased so as to be located side by side to close said opening when no external forces are applied to said barrier mechanism.

10. A barrier mechanism according to claim 7, further comprising means for guiding said barrier plate assemblies in sliding relation to one another.

11. A barrier mechanism of a lens barrel according to claim 10, wherein said means for guiding guide translational movement of said barrier plates.

12. A barrier mechanism of a lens barrel according to claim 11, further comprising a driving plate which rotates about an optical axis of said lens barrel, wherein said means for guiding comprise association means provided on said barrier plates and on said driving plate.

13. A barrier mechanism according to claim 7, further comprising means for opening said barrier plate assemblies upon engagement of said means for opening by an engagement surface of a movable lens frame.

14. A barrier mechanism according to claim 7, wherein said barrier plate assemblies comprise means for automatically closing upon accommodation of a lens in said lens barrel.

15. A lens barrier for opening and closing a lens opening of a lens barrel, comprising:

two barrier plates which are spaced from one another in the direction along the optical axis of the lens barrel so as to slide in a direction perpendicular to the optical axis; and, a barrier driving mechanism which moves said barrier plates between an open position in which said barrier plates are superimposed on one another outside the lens opening and a closed position in which said barrier plates are located side by side in the lens opening to close the opening.

16. A lens barrier according to claim 15, wherein said barrier plates comprise two pairs of first and second barrier plates which are located in a symmetrical arrangement with respect to a center of the lens opening and which are offset from one another in the direction of the thickness of the barrier plates.

17. A lens barrier according to claim 16, further comprising guide means for guiding said pair of first barrier plates so as to move between said closed position in which said first barrier plates come into contact with each .other substantially at the center of the lens opening and said opened position in which said first barrier plates are retracted to the outside of the lens opening.

18. A lens barrier according to claim 17, further comprising a driving plate which rotates about the optical axis, and wherein said first barrier plates and said driving plate are provided with first association means which causes a parallel translation movement of said first barrier plates in accordance with a rotation of said driving plate.

19. A lens barrier according to claim 18, wherein said association means comprises at least one radial association groove provided on one of said first barrier plates or said driving plate and at least one association pin which is provided on the other of said driving plate or said first barrier plates to be fitted in said association groove.

20. A lens barrier according to claim 19, further comprising a second association means for associating said pair of second barrier plates with said first barrier plates so as to move in parallel translation between said open position in which said second barrier plates are retracted to the outside of the lens opening and said closed position in which said second barrier plates and said first barrier plates are located side by side to cooperate in closing the lens opening.

21. A lens barrier according to claim 20, wherein said first barrier plates have key projections extending in the direction of the slide movement of said first plates and said second barrier plates have elongated holes which extend in the direction of the slide movement of said second plates, whereby said key projections of said first barrier plates are fitted in the corresponding said elongated holes.

22. A lens barrier according to claim 21, further comprising a lens barrel having a lens opening, said lens barrel being provided with slide movement restricting grooves which extend in the direction of the slide movement, so that said key projections of said first barrier plates which extend through said elongated holes are fitted in the corresponding said slide movement restricting grooves.

23. A lens barrier according to claim 22, wherein said lens opening is generally rectangular, and wherein said first and second barrier plates move in a direction parallel with the shorter sides of the rectangle of said lens opening.

24. A lens barrier comprising:

at least two barrier plates which move between a closed position and an open position;

barrier driving means for driving at least one of said barrier plates to move said at least one barrier plate between said open position, in which said barrier plates are superimposed on one another to open a lens opening of a lens barrel, and said closed position, in which said barrier plates are located side by side to close the lens opening of the lens barrel; and, association means for functionally connecting an other one of said barrier plates to said one barrier plate to move said other barrier plate between said open position and said closed position in association with said one barrier plate.

25. A barrier mechanism of a lens barrel according to claim 24, wherein said barrier mechanism comprises means guiding said barrier plates for translational movement.

26. A barrier mechanism of a lens barrel having barrier plates for opening and closing an opening of said lens barrel, said barrier plates being slidable relative to each other, so as to open and close said opening, between an operative position, in which at least two of said barrier plates are substantially overlapped to open said opening, and an inoperative position, in which said barrier plates are extended to a partially overlapped position in which said barrier plates close said opening wherein said at least two barrier plates are overlapped to a lesser extent when in said inoperative position than the extent to which said at least two barrier plates are overlapped when in said operative position, wherein said barrier mechanism comprises a guide for guiding translational movement of said barrier plates.

27. A barrier mechanism in accordance with claim 26, wherein said plurality of barrier plates comprise two sets of barrier plates, wherein said barrier plates in each set of said two sets of barrier plates are overlapped to different extents in said operative and inoperative positions, said two sets being located along opposed sides of said lens barrel opening.

* * * * *